United States Patent
Russell et al.

(10) Patent No.: US 10,280,947 B2
(45) Date of Patent: May 7, 2019

(54) GAS VALVE ASSEMBLY WITH INTEGRATED PRESSURE REGULATOR

(71) Applicants: Steven L. Russell, Cabool, MO (US); David Crites, West Plains, MO (US)

(72) Inventors: Steven L. Russell, Cabool, MO (US); David Crites, West Plains, MO (US)

(73) Assignee: Robertshaw Controls Company, Itasca, IL (US)

(*) Notice: Subject to any disclaimer, the term of this patent is extended or adjusted under 35 U.S.C. 154(b) by 661 days.

(21) Appl. No.: 14/504,919

(22) Filed: Oct. 2, 2014

(65) Prior Publication Data

US 2016/0097403 A1 Apr. 7, 2016

(51) Int. Cl.
- *F15B 5/00* (2006.01)
- *F23N 1/00* (2006.01)
- *F23N 5/24* (2006.01)
- *F16K 27/00* (2006.01)

(52) U.S. Cl.
CPC ............. *F15B 5/003* (2013.01); *F16K 27/00* (2013.01); *F23N 1/005* (2013.01); *F23N 1/007* (2013.01); *F23N 5/245* (2013.01); *F23N 5/247* (2013.01); *F23N 2031/12* (2013.01)

(58) Field of Classification Search
CPC .. F15B 5/003; Y10T 137/598; Y10T 137/599; Y10T 137/5994; Y10T 137/6011; Y10T 137/6171; Y10T 137/7504; F16L 27/00; B60P 1/162; F23N 1/00
USPC ............................ 137/315.04, 305.05, 315.11
See application file for complete search history.

(56) References Cited

U.S. PATENT DOCUMENTS

| | | | |
|---|---|---|---|
| 4,150,673 A * | 4/1979 | Watt ......................... | A61J 1/10 128/DIG. 24 |
| 4,524,807 A * | 6/1985 | Toliusis .............. | F15B 13/0817 137/269 |
| 4,657,047 A * | 4/1987 | Kolibas ................. | B05B 12/149 137/240 |
| 5,675,978 A * | 10/1997 | Hamm, Jr. ............ | F25B 31/002 137/625.19 |
| 5,725,511 A * | 3/1998 | Urrutia ..................... | A61J 1/10 285/914 |
| 6,053,198 A * | 4/2000 | Atkin .................. | F15B 13/0807 137/271 |
| 6,261,069 B1 * | 7/2001 | Djordjevic ............ | F04B 1/0404 137/493.3 |
| 6,499,719 B1 * | 12/2002 | Clancy .................... | F16L 37/23 251/149.6 |
| 7,484,769 B2 * | 2/2009 | Domash ................ | A61M 39/10 285/124.4 |
| 7,866,340 B2 * | 1/2011 | Mele ........................ | A62B 9/02 128/205.24 |
| 2003/0020037 A1 * | 1/2003 | Pierog ................ | G05D 16/2013 251/129.01 |
| 2004/0084085 A1 * | 5/2004 | Fancher ................ | F16K 27/003 137/356 |

(Continued)

*Primary Examiner* — Jessica Cahill

(74) *Attorney, Agent, or Firm* — Reinhart Boerner Van Deuren P.C.

(57) ABSTRACT

A gas valve assembly with integrated pressure regulator is provided. The gas valve assembly includes a pressure regulator and a gas valve module. The pressure regulator and gas valve modules each include cast housing bodies. The cast housing bodies have cast in mounting holes and assembly features that allow for the assembly of the gas valve assembly without secondary machining operations.

19 Claims, 13 Drawing Sheets

(56) References Cited

U.S. PATENT DOCUMENTS

2008/0012333 A1* 1/2008 Gauss ................... F16L 21/00
285/399
2014/0224355 A1* 8/2014 Okitsu ............... F16K 31/5286
137/505.11

* cited by examiner

GAS VALVE ASSEMBLY WITH INTEGRATED PRESSURE REGULATOR

FIELD OF THE INVENTION

This invention generally relates to gas transmission, and more particularly to gas valves used for the supply and regulation of the flow of gas in gas fueled applications.

BACKGROUND OF THE INVENTION

In a typical gas burning appliance, e.g. an oven, it must be ensured that ignition of the flow of gas will occur to avoid the hazardous scenario of supplying gas without it simultaneously being burned off. To achieve this, a number of components are utilized. Among these components, a pressure regulator is required to regulate the pressure incoming flow of gas supplied to a downstream burner. Additionally, and between the pressure regulator and the burner, a gas valve is provided which is responsible for opening and closing gas flow to one or more burners, and can also be utilized for governing the amount of flow to the burners to ensure a desired cooking temperature is achieved.

The aforementioned configuration also typically includes safety measures to ensure that gas will not be supplied to the burners in the event that ignition of such gas is not assured. As one example, the valve may be electrically coupled to an igniter. In the event the igniter is hot enough to ignite gas, the electrical current flow to the valve sufficient to cause it to open. In the event that the igniter is not hot enough to ignite the gas flowing to the burners, the valve will remain closed.

Gas appliance manufacturers typically purchase the above valves and pressure regulators and assemble the same to provide an appliance to the end user. However, such components are typically provided separately and thus require an additional assembly step at the appliance manufacturer. Because the pressure regulator and valve are typically not supplied by the same manufacturer, they often times include universal mating interfaces so that they may be readily joined to one another.

Unfortunately, the applicants herein have discovered that this universal mating interface may lead to failure at the interface when the end user gas line is installed at the pressure regulator inlet. Indeed, the torque applied when installing the end user gas line has been found to produce relatively high shear forces on the mounting hardware at the universal interface between the pressure regulator and valve leading to breakage of this hardware and/or other portions of the pressure regulator-valve assembly.

Further, the manufacture of the above described valves can be relatively complex in that the same require producing a housing, subsequently machining the housing so that the valve componentry may be mounted therein, installing the valve componentry within the housing, and also installing on the housing additional bracketing for mounting the valve within the appliance interior. Such a process is labor and cost intensive, ultimately increasing end user cost in purchasing the appliance.

As such, there is a need in the art for a gas valve assembly that includes an integrated pressure regulator and includes provisions for accommodating the torque applied to the regulator to mitigate the above shear forces. There is also a need in the art for a gas valve assembly with integrated pressure regulator that presents a reduced cost and labor effort in its manufacture.

The invention provides such a gas valve assembly. These and other advantages of the invention, as well as additional inventive features, will be apparent from the description of the invention provided herein.

BRIEF SUMMARY OF THE INVENTION

In one aspect, the invention provides a gas valve assembly that advantageously includes a mounting arrangement formed between a pressure regulator and a valve module that reinforces the interface between the pressure regulator and valve module so that the shear forces from the torque applied to the pressure regulator when installing an end user's line thereto are substantially reduced. An embodiment of this aspect may include a pressure regulator and a valve module. The pressure regulator is mounted to the valve module along a mounting axis defined by the valve module. A mounting arrangement is formed between the pressure regulator and the valve module such that the pressure regulator is rotationally fixed about the mounting axis and such that the pressure regulator is capable of only a single orientation relative to the valve module.

In one embodiment according to this aspect, the mounting arrangement includes a mounting boss and a recess. The boss is received within the recess. The mounting boss projects from a side wall of a housing body of the valve module. The recess is formed into a port of a housing body of the pressure regulator. A seal groove surrounds the mounting boss.

The mounting boss may have a non-circular cross section. The recess is defined by an inner peripheral wall of a port of the pressure regulator. The recess may also have a non-circular periphery. In certain embodiments, the mounting boss has a generally U-shaped cross section. The recess has a generally U-shaped periphery which corresponds to an outer periphery of the mounting boss.

In one embodiment according to this aspect, the pressure regulator and valve module each include at least one integral cast in mounting bracket. The valve module includes a housing body having at least one cast in cavity. The cavity defines an opening and adapted to receive a valve operator. The opening of the at least one cast in cavity is surrounded by a cast in seal groove and a plurality of cast in mounting holes.

In another aspect, the invention provides a gas valve assembly that advantageously includes cast in mounting brackets such that it is unnecessary to subsequently install mounting brackets to the gas valve assembly for mounting the gas valve assembly to an appliance. An embodiment of this aspect includes a pressure regulator and a valve module. The pressure regulator is mounted to the valve module. The valve module includes a cast housing body having at least one integral cast in mounting bracket. The cast in mounting brackets are adapted to mount the gas valve assembly within the interior of an appliance.

In an embodiment according to this aspect, the at least one integral cast in mounting bracket of the housing body of the valve module includes an open ended slot. In certain embodiments, the at least one integral cast in mounting bracket of the housing body of the valve module includes a plurality of integral cast in mounting brackets. The at least one integral cast in mounting bracket of the housing body of the pressure regulator includes a mounting hole at a distal end thereof.

In an embodiment according to this aspect, the pressure regulator is mounted to the valve module via a mounting arrangement. The mounting arrangement is adapted to allow only a single orientation of the pressure regulator relative to the valve module. The mounting arrangement includes a mounting boss and a recess. The boss is received within the recess. The mounting boss projects from a side wall of a housing body of the valve module. The recess is formed into a port of a housing body of the pressure regulator.

In an embodiment according to this aspect, the housing body of the valve module has at least one cast in cavity. The at least one cast in cavity defines an opening and is adapted to receive a valve operator. The opening of the at least one cast in cavity is surrounded by a cast in seal groove and a plurality of cast in mounting holes.

In yet another aspect, the invention provides a gas valve assembly that advantageously includes a gas valve module having cast in mounting holes for installing valve operators therein such that secondary machining operations to the gas valve module are not required to configure it for receiving the valve operators. An embodiment according to this aspect includes pressure regulator and a gas valve module. The pressure regulator is mounted to the gas valve module. The gas valve module includes a cast housing body with at least one cavity in said cast housing body. The at least one cavity defines an opening. The at least one cavity is adapted to receive a first valve operator which is insertable into the at least one cavity through the opening of the at least one cavity. A first plurality of cast in mounting holes are situated adjacent the opening of the at least one cavity and adapted to receive mounting hardware for mounting the first valve operator within at least one first cavity.

In yet another aspect, the invention provides a method of manufacturing a gas valve assembly. An embodiment of such a method according to this aspect includes providing a valve module having a cast housing body. The cast housing body includes cast in mounting brackets for mounting the gas valve assembly and cast in mounting holes for receiving mounting hardware for mounting at least one valve operator in the cast housing body. The method also includes providing a pressure regulator having a cast housing body. The cast housing body of the pressure regulator includes at least one cast in mounting bracket for mounting the gas valve assembly and cast in mounting holes for receiving mounting hardware for mounting the pressure regulator to the valve module. The method also includes joining the pressure regulator to the valve module, wherein no secondary machining operations to either the pressure regulator housing body or the valve module housing body are required to join the pressure regulator to the valve module. The method also includes installing the at least one valve operator into the cast housing body of the valve module, wherein no secondary machining operations to the cast housing body of the valve module are required to mount the at least one valve operator into the cast housing body.

In yet another aspect, the invention provides a method of manufacturing a gas valve assembly that advantageously ensures the proper orientation of a pressure regulator relative to a valve module. An embodiment of a method according to this aspect includes providing a valve module having a cast housing body, wherein the cast housing body of the valve module includes a cast in mounting boss. The method also includes providing a pressure regulator having a cast housing body, wherein the cast housing body of the pressure regulator includes a cast in recess. An inner peripheral wall of the cast in recess matches an outer peripheral wall of the cast in mounting boss such that the pressure regulator is capable of only a single orientation relative to the valve module. The method also includes installing the pressure regulator onto the valve module by inserting the cast in boss of the housing body of the valve module into the cast in recess of the housing body of the pressure regulator and fixedly securing the pressure regulator to the valve module. In an embodiment according to this aspect, the step of securing includes securing the pressure regulator to the valve module using mounting hardware.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
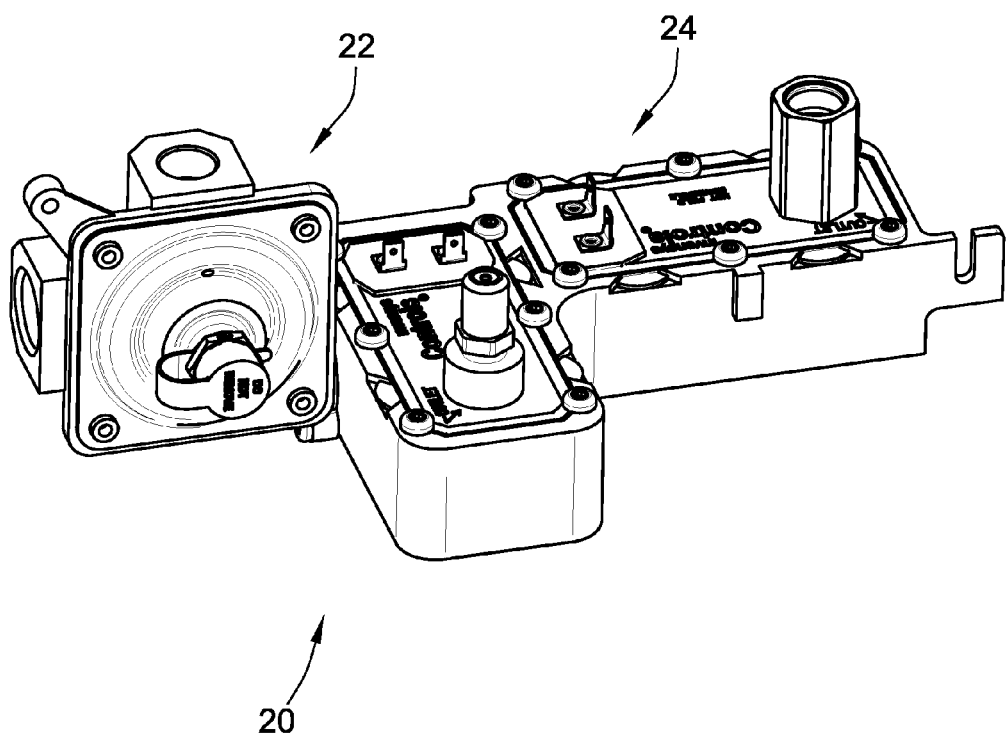
FIG. 1 is a perspective view of an embodiment of a gas valve assembly with integrated pressure regulator.

Turning now to the drawings, an embodiment of a gas valve assembly with integrated pressure regulator is shown and described. With particular reference to FIG. 1, the gas valve assembly 20 illustrated advantageously overcomes existing problems in the art by presenting a configuration that may be readily manufactured without the number of manufacturing operations required of other contemporary gas valve assemblies. Furthermore, gas valve assembly 20 also overcomes existing problems in the art by presenting a mounting arrangement which is formed between a valve module 22 of gas valve assembly 20 and a pressure regulator 24 of gas valve assembly 20. As will be explained in greater detail below, this mounting arrangement accommodates the torque applied when installing an inlet pipe to the pressure regulator such that the shear forces on the mounting hardware utilized to mount pressure regulator 24 to valve module 22 are substantially reduced.

Figure 2:
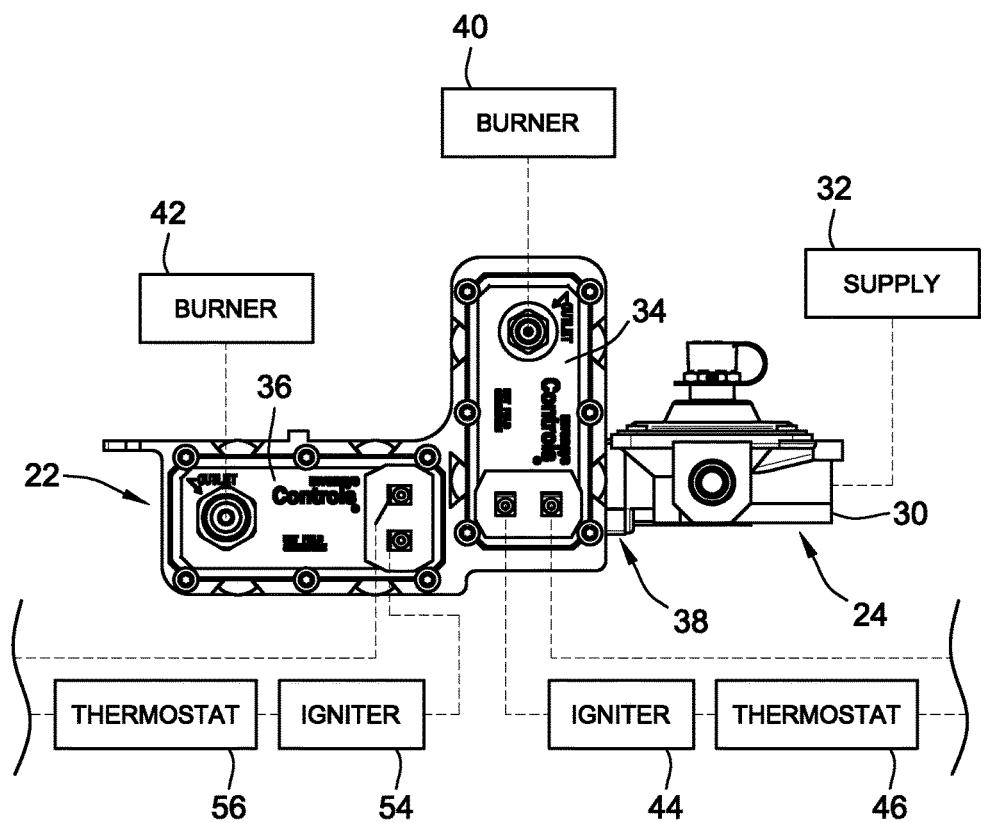
FIG. 2 is a top view of the gas valve assembly of FIG. 1, schematically represented in its operational environment.

Turning now to FIG. 2, a schematic representation of the operational environment of gas valve assembly 20 is illustrated. An inlet 30 of pressure regulator 24 is connected to a gas supply line 32 schematically shown. Gas is permitted to flow through pressure regulator 24. Pressure regulator 24 ensures that a sufficient output pressure is provided to valve module 22. Pressure regulator 24 may be embodied as any type of pressure control device, and in the exemplary embodiment, pressure regulator 24 is a diaphragm style pressure regulator.

Gas from pressure regulator 24 then flows to two valve operators 34, 36. Valve operator 34 is connected to a burner 40 and an igniter 44 in series connection with a thermostat 46. Valve operator 36 is connected to a burner 42 and an igniter 54 in series connection with a thermostat 56. Upon a call for heat from thermostats 46, 56, and once igniters 44, 46 achieve a temperature sufficient enough to ignite gas that may flow from either of burners 40, 42, an electrical signal is sent from igniter 44, 46 (or an associated controller) to its associated valve operator 34, 36. This electrical signal causes valve operators 34, 36 to open to allow gas to flow to their respective burner and become ignited by igniters 44, 46. It will be recognized that the foregoing operation may occur with either or both operators 34, 36 and their associated igniters 44, 54 and thermostats 46, 56.

Although two operators are utilized, those skilled in the art will recognize that the invention herein could be applied to a single operator system, or to a system having more than two operators. Further, although thermostats 46, 56 are schematically illustrated, it will be recognized that these elements may be embodied as physical thermostatic controls with electrical contacts or be part of the electronic control module of the appliance.

It will be recognized that the term "burner" used herein is used generally and not meant to limit the connection of gas valve assembly 20 to any particular gas burning device. For example, gas valve assembly 20 could be utilized in a residential cooking oven. Burner 40 could be the main burner of the oven, while burner 42 could be the broiler burner of the oven. Those skilled in the art will immediately recognize that these are only several examples of many, and the invention is thus not limited to the particular burner it provides gas flow to.

Further, the valve operators 34, 36 may for example be 3-volt thermal safety valves which will be recognized by those of skill in the art as those valves which are normally closed and will only open upon receiving a sufficient electrical signal commanding them to do so. As one example, valve operators 34, 36 may be set such that they will only open upon receiving a high enough electrical current from igniter 44 or an associated controller.

Figure 3:
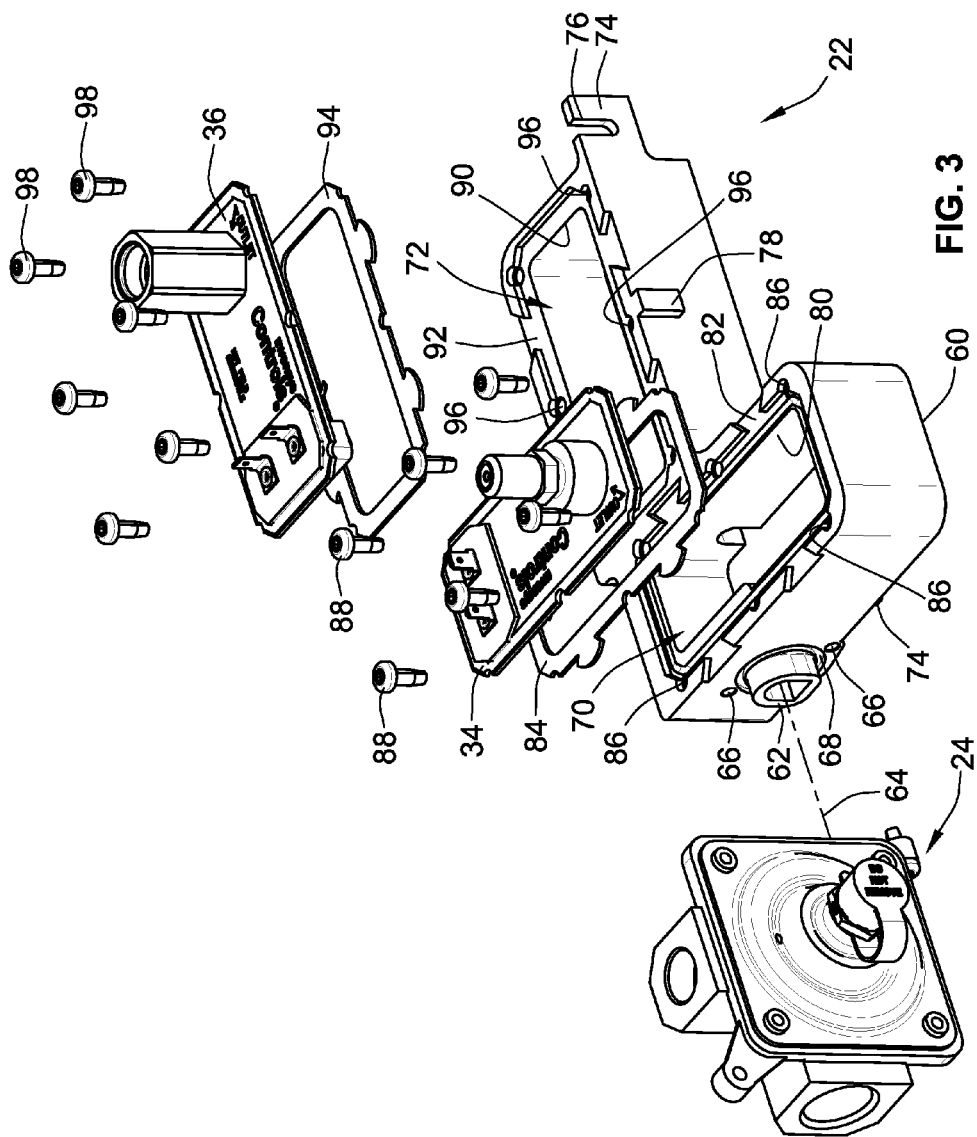
FIG. 3 is an exploded view of the gas valve assembly of FIG. 1.

Turning now to FIG. 3, gas valve assembly 20 is illustrated in an exploded view. Valve module 22 includes a cast housing body 60. As will be explained in greater detail below, cast housing body 60 includes cast-in features which advantageously reduce the operations required in assembling and mounting gas valve assembly 20.

Housing body 60 has a mounting boss 62 which mates with a corresponding mounting recess in pressure regulator 24 as explained below. Mounting boss 62 defines a mounting axis 64. Upon mounting pressure of regulator 24 to valve module 22 at mounting boss 62, pressure regulator 24 is not free to rotate about mounting axis 64. In other words, mounting boss 62 is shaped such that it will only permit a single orientation of pressure regulator 24 relative to valve module 22 when installed. In other words, mounting boss 62 is shaped such that it is not possible to install pressure regulator 24 onto valve module 22 in any other orientation than the orientation shown.

Mounting holes 66 are positioned adjacent mounting boss 62 and are utilized for the mounting of pressure regulator 24 to valve module 22. These mounting holes 66 are cast-in, and advantageously do not require any secondary machining in order to receive the mounting hardware used to mount pressure regulator 24 to valve module 22. The location and number of mounting holes 66 shown is exemplary only.

The phrase "without any secondary machining" as used herein means that there is no additional drilling and tapping operations required to mounting holes 66 so that they may receive mounting screws. The aforementioned phrase, however, is not meant to encompass the minor flash removing operations post-casting such as for example filing the edges of housing body 60. Indeed, "secondary machining" means a machining operation wherein it would be necessary to fixture the cast housing body in a machine tool for milling and other machining operations.

A seal groove 68 may also surround mounting boss 62 to receive an O-ring or any other type of seal between pressure regulator 24 and valve module 22 at the interface thereof. The geometry of this seal groove is dependent upon the particular seal used, and may be omitted in certain applications.

Housing body 60 of valve module 22 also includes cast-in cavities 70, 72. Cavity 70 receives valve operator 34. Cavity 72 receives valve operator 36. Additionally, housing body 60 of valve module 22 also includes cast-in mounting brackets 74 each of which having a slotted opening 76. These cast-in mounting brackets and slotted openings 74, 76 are utilized to mount gas valve assembly 20 in an appliance. As an advantageous result, it is thus not necessary to install additional mounting brackets after casting housing body 60 for purposes of mounting the same. The particular number of cast in brackets 74 is shown is not limiting on the invention, as fewer or greater cast in brackets may be provided. Additionally, housing body 60 may also include one or more locating bosses 78 for locating gas valve assembly 20.

Cavity 70 defines an opening 80 as shown. A seal groove 82 surrounds opening 80. Seal groove 82 receives a seal 84 between valve operator 34 and housing body 60. Seal 84 may be a gasket, or may be a liquid seal material. It will be recognized that the particular geometry of seal groove 82 will change depending on the type of seal used. Seal groove 82 is also a cast-in feature, and as such, does not require any secondary machining as defined herein.

A plurality of cast-in mounting holes 86 also surround opening 80. These cast-in mounting holes 86 are configured to receive mounting hardware 88 which will bias valve operator 34 into cavity 70 and compress seal 84. These mounting holes 86 are cast-in features and thus do not require any secondary machining as defined herein to receive mounting hardware 88.

Cavity 72 also defines an opening 90. A seal groove 92 surrounds opening 90 and receives a seal 94 positioned between valve operator 36 and housing body 60. Seal 94 may also be a gasket, liquid seal element, or any other seal. The particular geometry of seal group 92 will vary depending upon the type of seal used. Seal groove 92 is also a cast-in feature, and as such, does not require any secondary machining as defined herein.

A plurality of mounting holes 96 also surround opening 90. Mounting holes 96 are also cast-in features and thus do not require any secondary machining to receive mounting hardware 98. It should be noted that mounting hardware 88, 98 may for example be self-tapping screws such that they make their own threads when installed in housing body 60. This threading operation during the installation of mounting hardware 88, 98 does not fall within the definition of secondary machining operations as defined herein.

Figure 4:
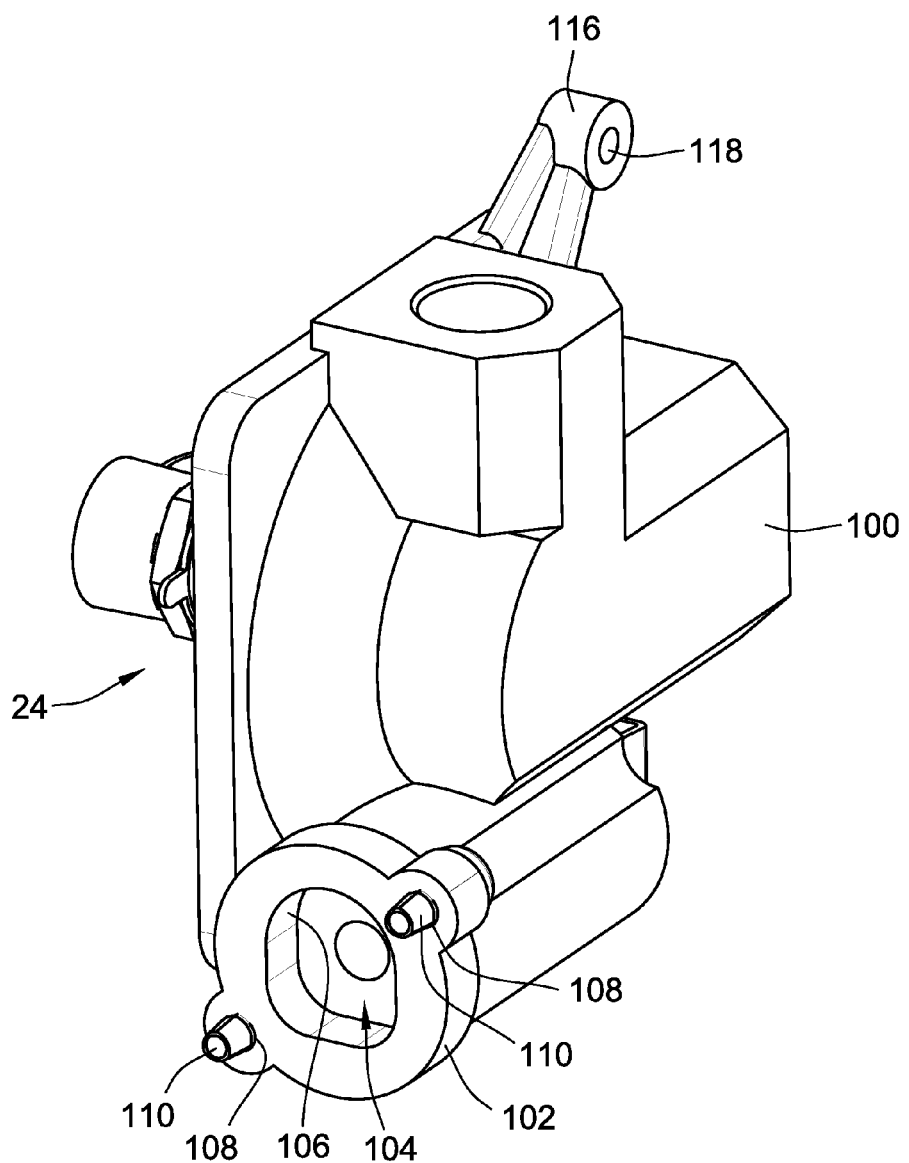
FIG. 4 is perspective view of a pressure regulator of the gas valve assembly of FIG. 1.

Turning now to FIG. 4, pressure regulator 24 will be described in greater detail. Pressure regulator 24 includes a cast housing body 100. Cast housing body 100 receives the interior workings of a contemporary diaphragm style pressure regulator. The interior workings of a contemporary pressure regulator are generally known and for purposes of brevity a detailed description thereof is dispensed herewith. Cast housing body 100, however, presents several novel features described herein.

Cast housing body 100 includes a port 102 which, in conjunction with mounting boss 62 (See FIG. 3), form the mounting arrangement 38 introduced above. Port 102 includes a recess 104. The inner peripheral wall 106 of recess 104 generally matches the outer peripheral wall of mounting boss 62 shown in FIG. 3 and described in greater detail below. This U-shaped configuration prevents the rotation of pressure regulator 24 about mounting access 64 (See FIG. 3) when mounting boss 62 is fully received within recess 104. This configuration also allows only a single orientation of pressure regulator 24 relative to valve module 22.

In other words, pressure regulator 24 has only one orientation that it may assume relative to valve module 22 to ensure that these components are always assembled correctly. A plurality of mounting holes 108 are also formed in port 102 which are alignable with mounting holes 66 surrounding mounting boss 62 shown in FIG. 3. Mounting hardware 110 is insertable through mounting holes 108 to install pressure regulator 24 against housing body 60 of valve module 22. Mounting holes 108 are cast-in features and as such, are produced without any secondary machining operations to in place the same as defined above. Mounting hardware 110 may for example be self-tapping screws.

Those skilled in the art will recognize that the foregoing step of securing the pressure regulator 24 to the valve module using mounting hardware 110 advantageously overcomes the need for the use of pipe fittings, as well as the need to incorporate threads onto either of pressure regulator 24 or valve module 22. As such, "mounting hardware" as used herein is meant to include screws, bolts, rivets, and other similar fasteners, but not traditional pipe fittings.

Pressure regulator 24 also includes a cast-in mounting bracket 116. Cast-in mounting bracket 116 includes a cast-in mounting hole 118. This allows for the mounting of gas valve assembly 20 within its appliance in conjunction with mounting brackets 74 described above relative to FIG. 3. Although only a single mounting bracket 116 is shown, those skilled in the art will recognize that additional brackets could be utilized. Mounting bracket 116 and its cast in mounting hole 118 are also cast in features that do not require any secondary machining.

Figure 5:
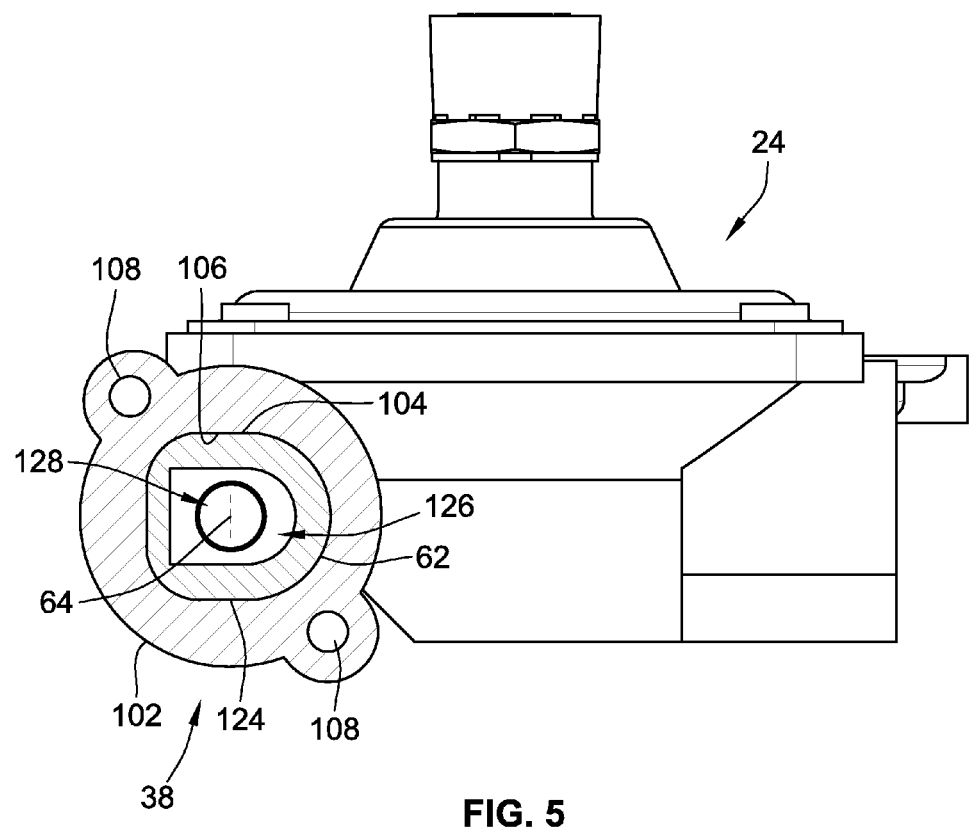
FIG. 5 is a cross sectional view of the gas valve assembly taken through a mounting arrangement thereof.

Turning now to FIG. 5, a cross-section through the mounting arrangement 38 formed between pressure regulator 24 and valve module 22 is shown. As can be seen herein, the inner peripheral wall 106 of port 102 defines a generally U-shape. Mounting boss 62 includes an outer peripheral wall 124 which matches the shape of the inner peripheral wall 106 of port 102. As introduced briefly above, this U-shaped configuration prevents pressure regulator 24 from rotating about mounting axis 64. Additionally, mounting boss 62 and recess 104 absorb a substantial amount of the torque applied to pressure regulator 24 when an inlet gas supply pipe is installed thereto. As a result, the shear forces on hardware passing through mounting holes 108 is substantially reduced or entirely eliminated in some cases.

It will be recognized that mounting arrangement 38 is not limited in its use to the particular components (i.e. pressure regulator 24 and valve module 22) illustrated. Indeed, this U-shaped boss and corresponding U-shaped recess may be utilized between any two components and achieve the advantages noted herein. Further, while pressure regulator 24 is shown with recess 104, and valve module 22 is shown with mounting boss 62, these items could be reversed such that the mounting boss 62 is a feature of pressure regulator 24, and the recess is a feature of valve module 22.

Figure 6:
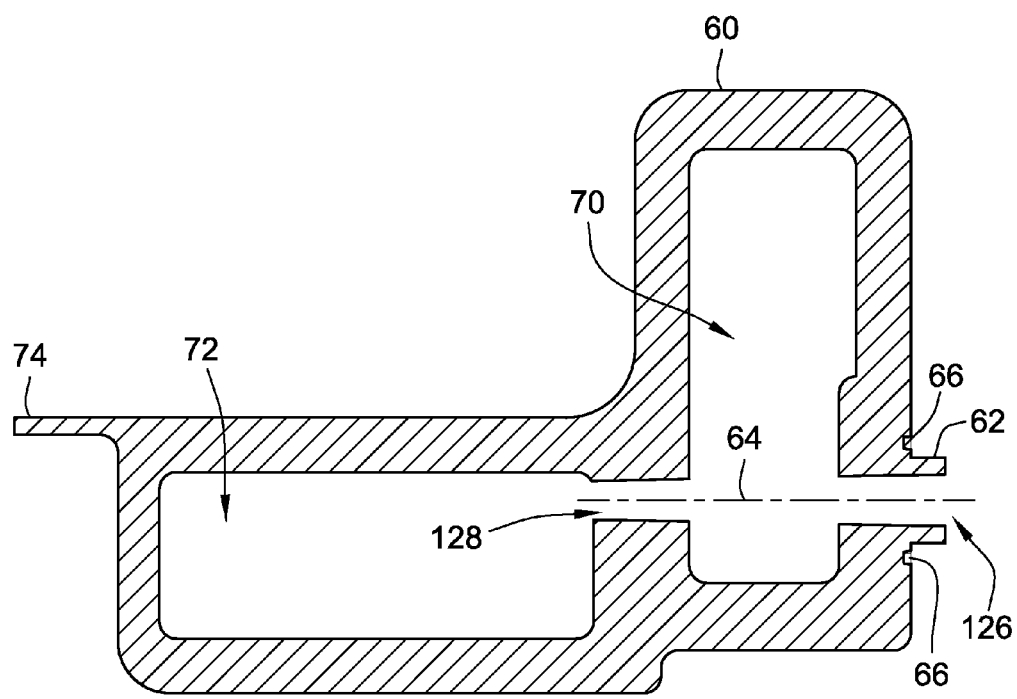
FIG. 6 is a cross sectional view of a housing body of a valve module of the gas valve assembly.

Turning now to FIG. 6, the same illustrates a cross-section through housing body 60 of valve module 22. As can be seen in this view, mounting boss 62 defines a main port 126 which extends into cavity 70. An intermediary port 128 joins cavity 70 with cavity 72. As a result, gas flowing in through main port 128 of mounting boss 62 is communicated into each of chambers 70, 72. Thereafter, this gas may be permitted to flow out of valve operators 34, 36 (See FIG. 3) as described above.

Figure 7:
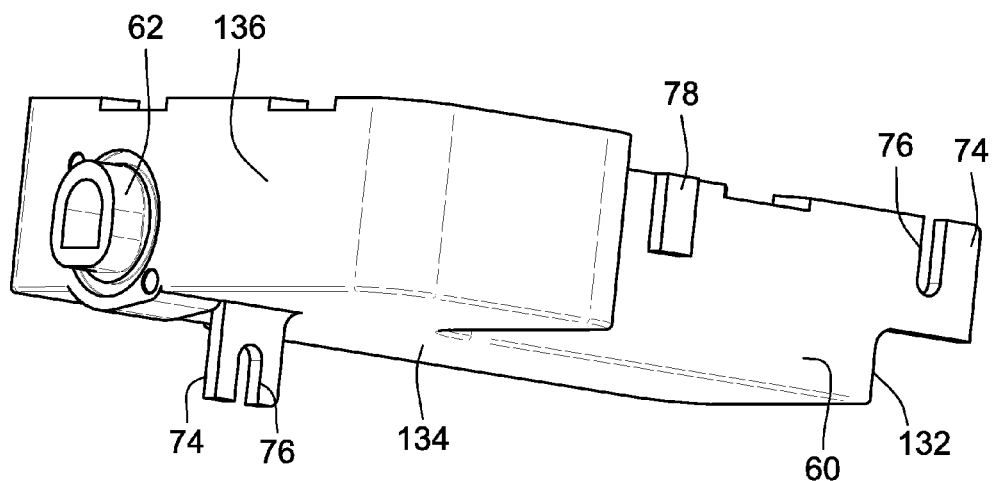
FIG. 7 is another perspective view of the gas valve assembly.
Figure 8:
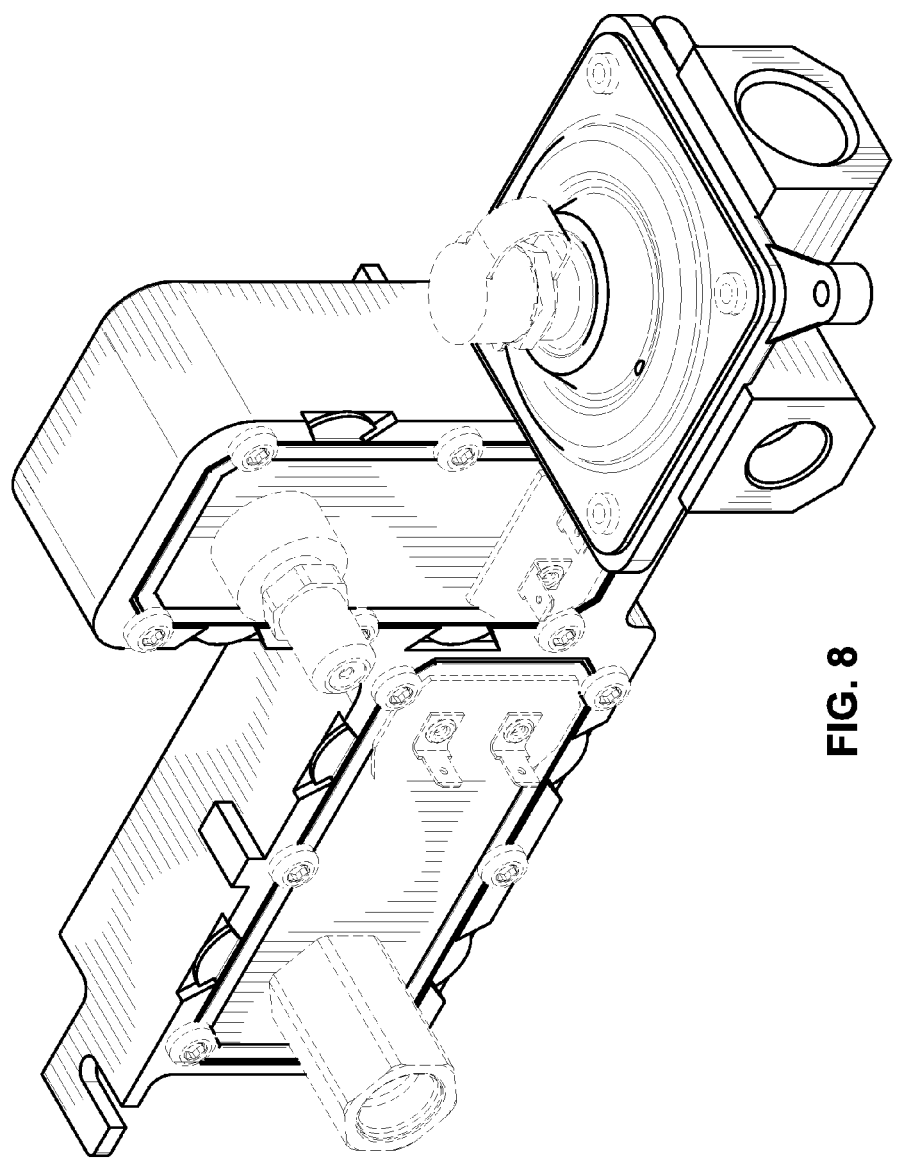
FIG. 8 is another perspective view of the gas valve assembly.
Figure 9:
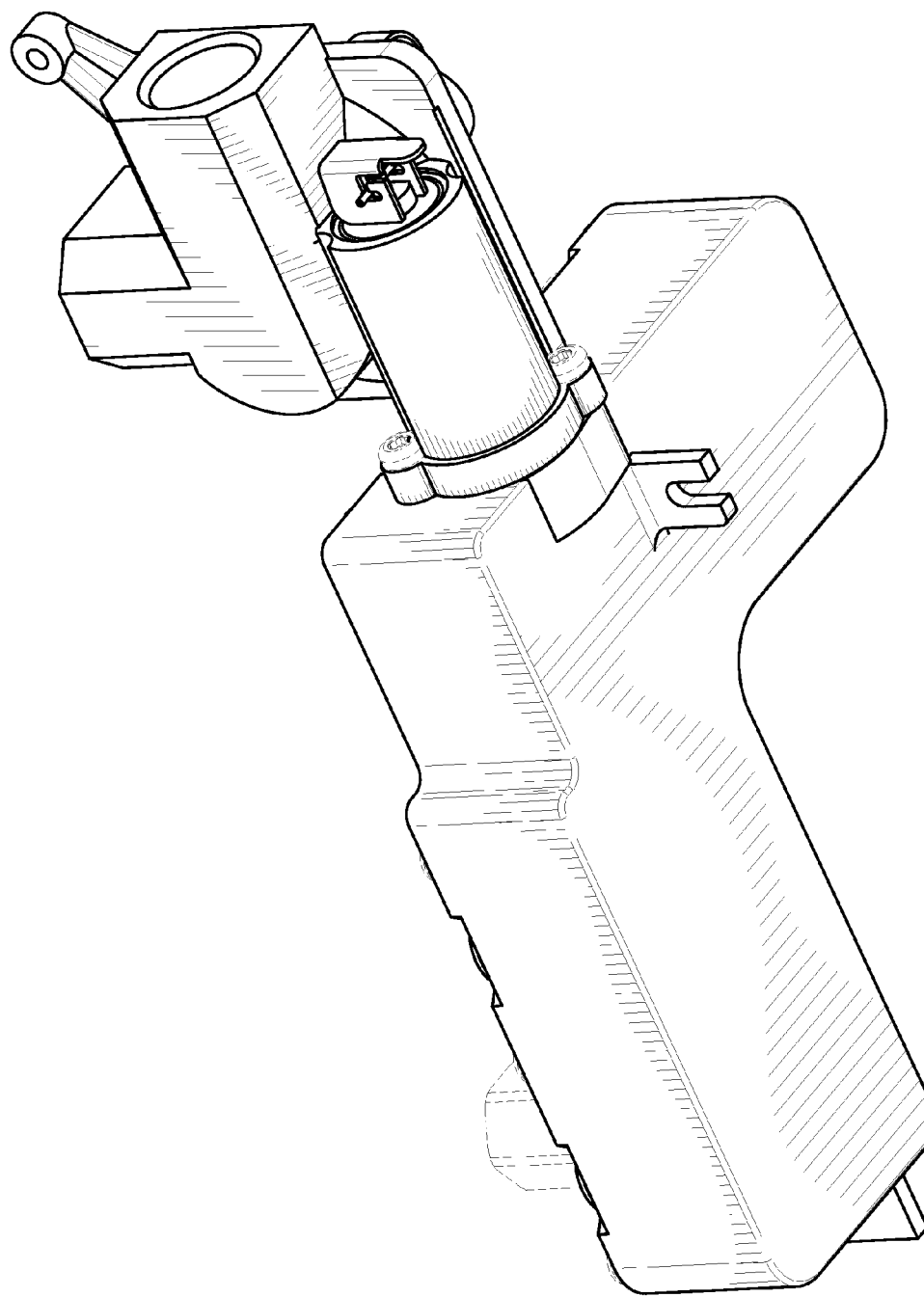
FIG. 9 is another perspective view of the gas valve assembly.
Figure 10:
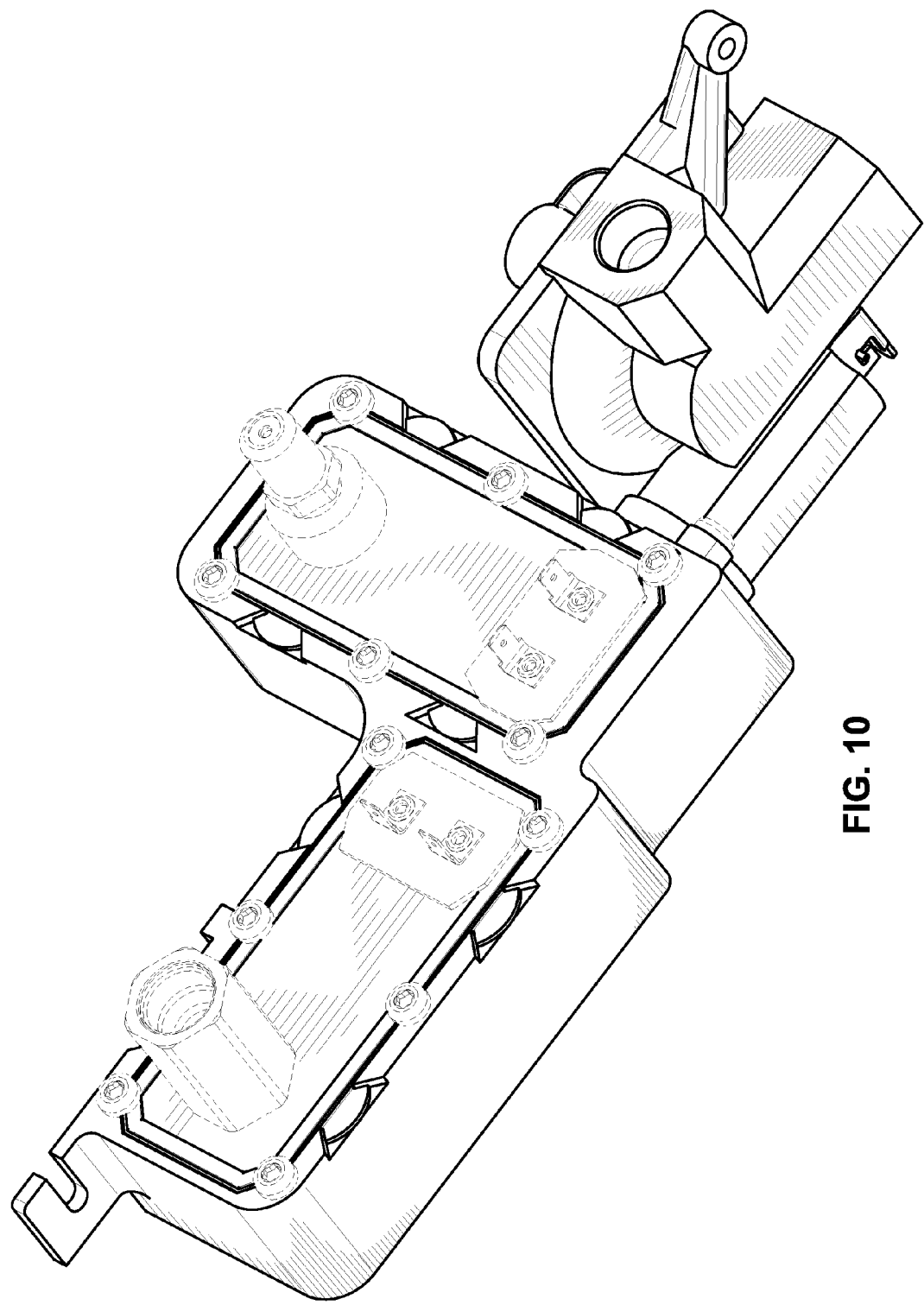
FIG. 10 is another perspective view of the gas valve assembly.
Figures 11, 12:
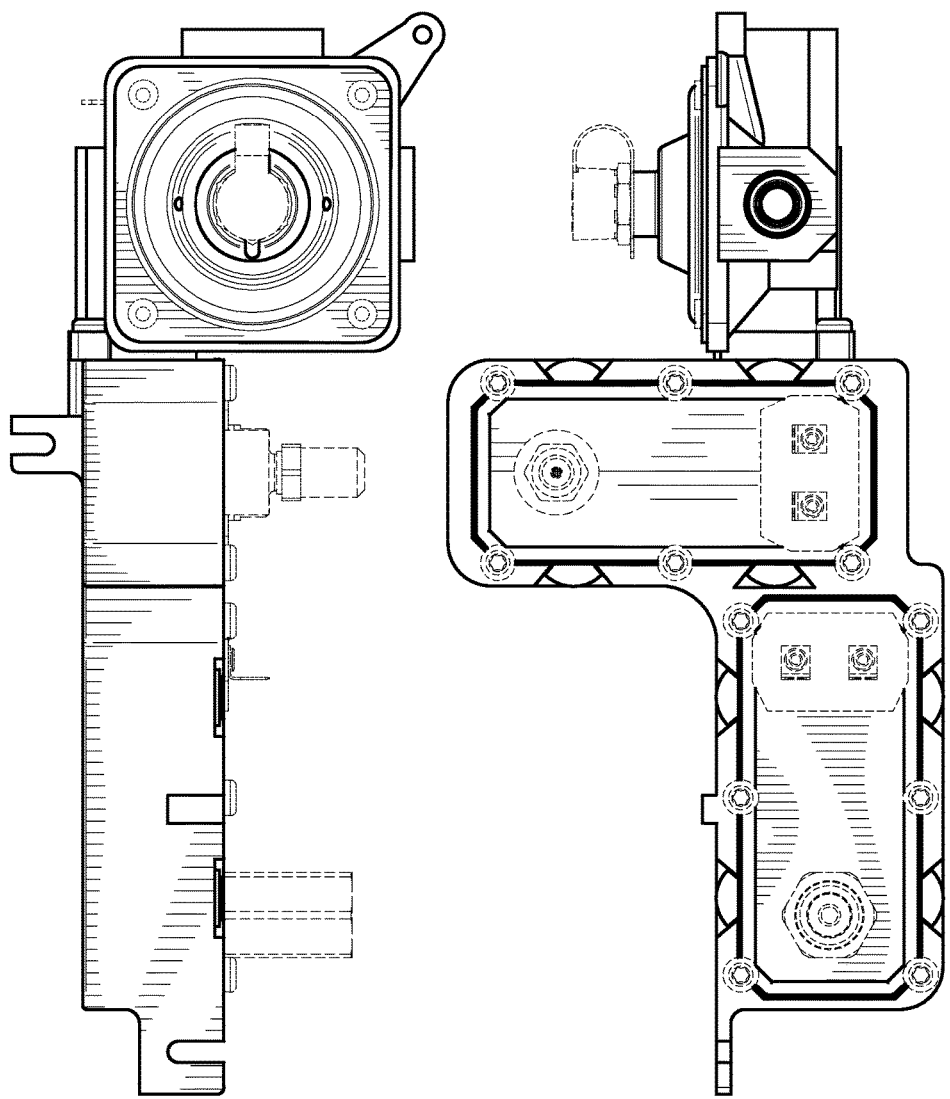
FIGS. 11-16 are orthogonal views of the gas valve assembly.
Figure 13:
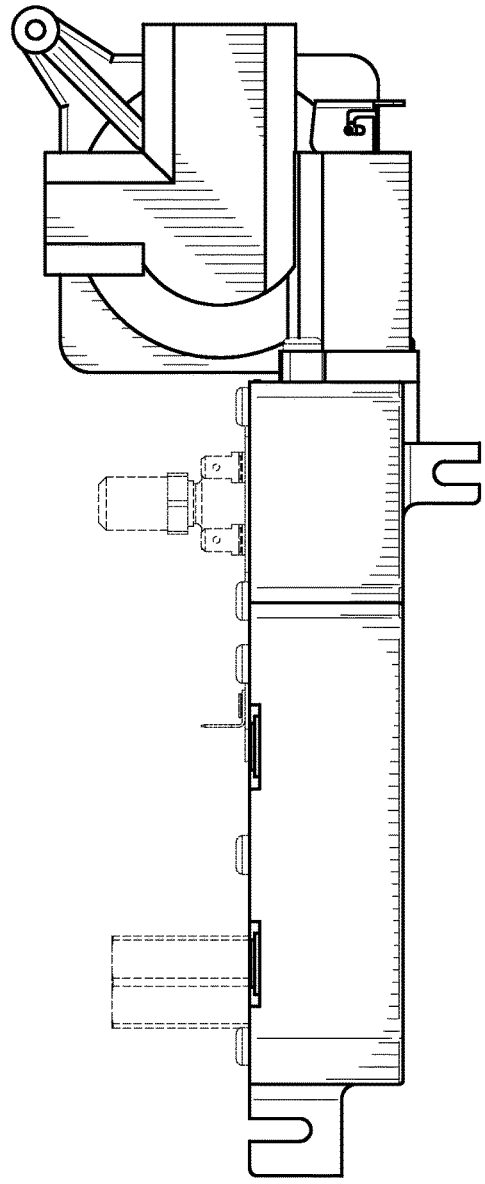
Figure 14:
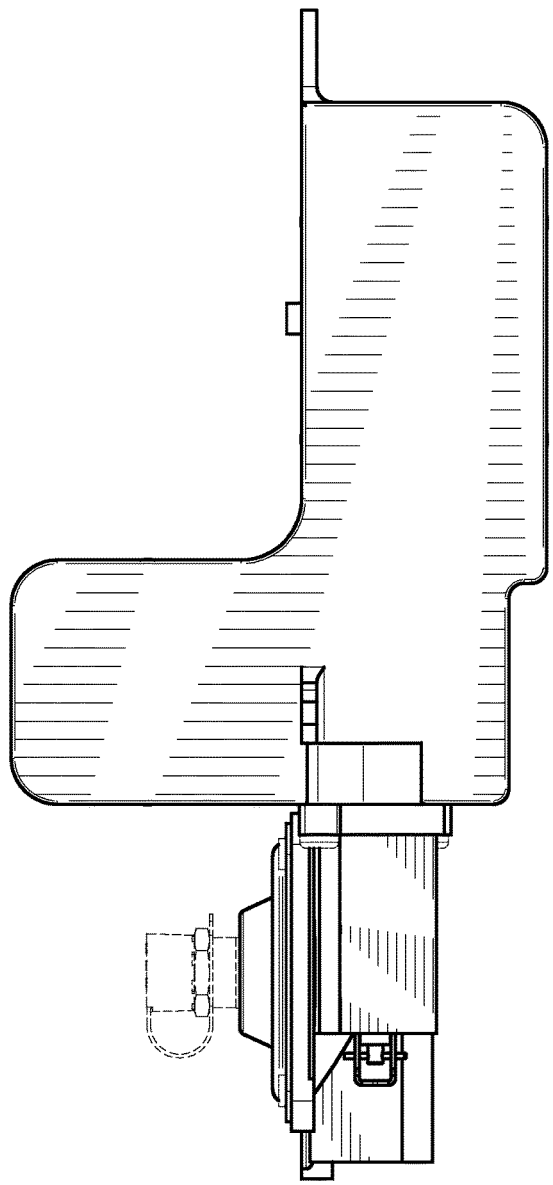
Figure 16:
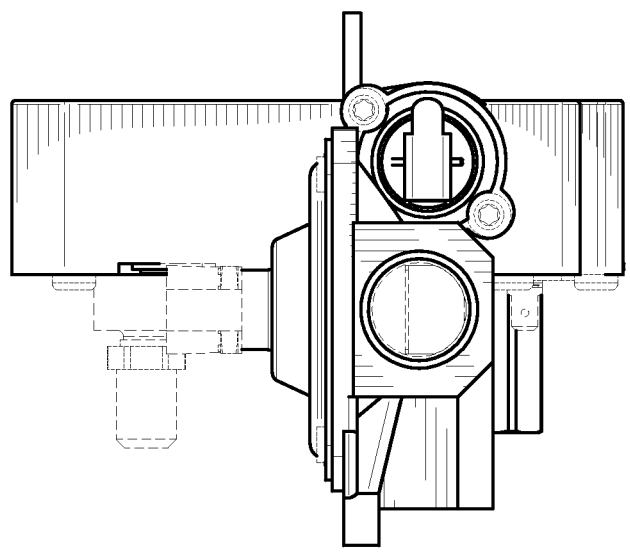
Figure 15:
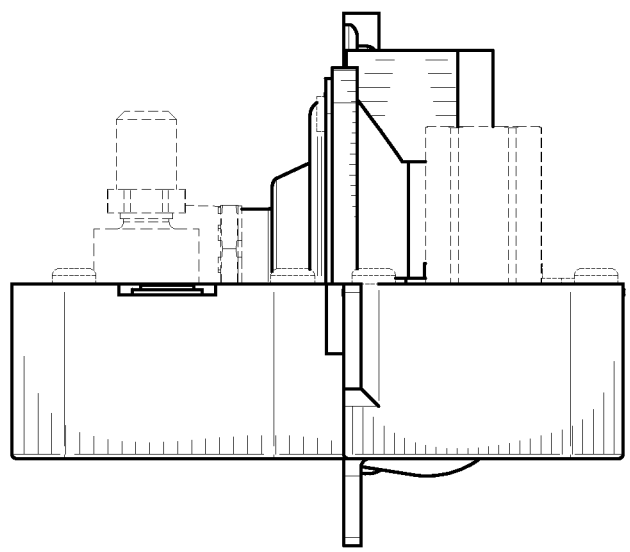

Turning now to FIG. 7, the same shows housing body 60 of valve module 22 in a generally perspective view. In this view, the mounting brackets 74 and their associated slots 76 can be readily seen, as well as locating boss 78 and mounting boss 62. The right-most mounting bracket 74 in FIG. 7 projects from a sidewall 132 of housing body 60. The left-most mounting bracket 74 in FIG. 7 projects from a bottom wall 134 in FIG. 7. Mounting boss 62 projects from a sidewall 136 which is generally in an opposed spaced relationship with sidewall 132.

As discussed above, all of the features of housing body 60 of valve module 22 are cast-in features. In other words, these features are not later produced by any secondary machining operations. As an advantageous result, once housing body 60 has been cast, it is ready to go directly to the assembly process. For purposes of assembly, it is only necessary to install valve operators 34, 36 into cavities 70, 72 respectively by positioning seals 84, 94 therebetween and fastening the same using mounting hardware 88, 98. This phase of assembly completes the valve module 22. It is then only necessary to align mounting boss 62 with mounting recess 104 of pressure regulator 24 and insert the same into said recess. Thereafter, mounting hardware 110 is used to fasten pressure regulator 24 to valve module 22. As briefly discussed above, there may additionally be a seal provided at the interface between pressure regulator 24 and valve module 22.

FIGS. 8-16 illustrate various perspective and standard views of the above-described embodiment in order to show surface contours thereof.

In the foregoing, it will be readily understood that embodiments of the invention herein advantageously overcome existing problems in the art by providing a low cost of manufacture gas valve assembly that does not require secondary operations. Instead, both the valve module and pressure regulator of the gas valve assembly utilize cast housing bodies which include cast-in features that do not require any additional secondary machining operations for purposes of assembling the gas valve assembly or for installing the same into an appliance.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A gas valve assembly, comprising:
   a pressure regulator;
   a valve module having a housing body, the pressure regulator mounted to the valve module along a mounting axis defined by the valve module; and
   wherein a mounting arrangement is formed between the pressure regulator and the housing body of the valve module such that the pressure regulator is removably mounted to the housing body and rotationally fixed about the mounting axis and such that the pressure regulator is capable of only a single orientation relative to the valve module;
   wherein the mounting arrangement includes a mounting boss and a recess, the boss received within the recess, and wherein the mounting boss defines a main port for a fluid flow into the valve module.

2. The gas valve assembly of claim 1, wherein the mounting boss projects from a side wall of the housing body of the valve module.

3. The gas valve assembly of claim 2, wherein the recess is formed into a port of a housing body of the pressure regulator.

4. The gas valve assembly of claim 3, wherein a seal groove surrounds the mounting boss.

5. The gas valve assembly of claim 1, wherein the pressure regulator and valve module each include at least one integral cast in mounting bracket.

6. The gas valve assembly of claim 1, wherein the housing body has at least one cast in cavity, the cavity defining an opening and adapted to receive a valve operator.

7. The gas valve assembly of claim 6, wherein the opening of the at least one cast in cavity is surrounded by a cast in seal groove and a plurality of cast in mounting holes.

8. A gas valve assembly, comprising:
   a pressure regulator;
   a valve module having a housing body, the pressure regulator mounted to the valve module along a mounting axis defined by the valve module; and
   wherein a mounting arrangement is formed between the pressure regulator and the housing body of the valve module such that the pressure regulator is removably mounted to the housing body and rotationally fixed about the mounting axis and such that the pressure regulator is capable of only a single orientation relative to the valve module;
   wherein the mounting arrangement includes a mounting boss and a recess, the boss received within the recess, and wherein the mounting boss defines a main port for a fluid flow into the valve module; and
   wherein the mounting boss has a non-circular cross section, and the recess is defined by an inner peripheral wall of a port of the pressure regulator, wherein the recess has a non-circular periphery.

9. A gas valve assembly, comprising:
   a pressure regulator;
   a valve module having a housing body, the pressure regulator mounted to the valve module along a mounting axis defined by the valve module; and
   wherein a mounting arrangement is formed between the pressure regulator and the housing body of the valve module such that the pressure regulator is removably mounted to the housing body and rotationally fixed about the mounting axis and such that the pressure regulator is capable of only a single orientation relative to the valve module;
   wherein the mounting arrangement includes a mounting boss and a recess, the boss received within the recess, and wherein the mounting boss defines a main port for a fluid flow into the valve module; and
   wherein the mounting boss has generally U-shaped cross section, and wherein the recess has a generally U-shaped periphery which corresponds to an outer periphery of the mounting boss.

10. A gas valve assembly, comprising:
    a pressure regulator, the pressure regulator comprising a cast housing body having at least one integral cast in mounting bracket, the at least one integral cast in mounting bracket adapted to mount the gas valve assembly within an interior of an appliance;
    a valve module having a cast housing body, the pressure regulator removably mounted to the cast housing body of the valve module, the cast housing body having at least one integral cast in mounting bracket, the at least one integral cast in mounting bracket adapted to mount the gas valve assembly within the interior of an appliance; and
    wherein a mounting boss projects from a side wall of the cast housing body of the valve module, the mounting boss defining a main port for a fluid flow into the valve module.

11. The gas valve assembly of claim 10, wherein the at least one integral cast in mounting bracket of the housing body of the valve module includes an open ended slot.

12. The gas valve assembly of claim 10, wherein the at least one integral cast in mounting bracket of the housing body of the valve module includes a plurality of integral cast in mounting brackets.

13. The gas valve assembly of claim 10, wherein the at least one integral cast in mounting bracket of the housing body of the pressure regulator includes a mounting hole at a distal end thereof.

14. The gas valve assembly of claim 10, wherein the pressure regulator is mounted to the valve module via a mounting arrangement, the mounting arrangement adapted to allow only a single orientation of the pressure regulator relative to the valve module, wherein the mounting arrangement includes the mounting boss and a recess, the boss received within the recess.

15. The gas valve assembly of claim 14, wherein the recess is formed into a port of a housing body of the pressure regulator.

16. The gas valve assembly of claim 10, wherein the housing body of the valve module has at least one cast in cavity, the cavity defining an opening and adapted to receive a valve operator.

17. The gas valve assembly of claim 16, wherein the opening of the at least one cast in cavity is surrounded by a cast in seal groove and a plurality of cast in mounting holes.

18. A method of manufacturing a gas valve assembly, comprising:
prov250 a valve module having a cast housing body, wherein the cast housing body of the valve module includes a cast in mounting boss defining a main port for a fluid flow into the valve module;
providing a pressure regulator having a cast housing body, wherein the cast housing body of the pressure regulator includes a cast in recess, wherein an inner peripheral wall of the cast in recess matches an outer peripheral wall of the cast in mounting boss such that the pressure regulator is capable of only a single orientation relative to the valve module;
installing the pressure regulator onto the valve module by inserting the cast in boss of the housing body of the valve module into the cast in recess of the housing body of the pressure regulator; and
fixedly securing the pressure regulator to the valve module.

19. The method of claim 18, wherein the step of securing includes securing the pressure regulator to the valve module using mounting hardware.

\* \* \* \* \*